(12) United States Patent
Kotler et al.

(10) Patent No.: US 9,026,944 B2
(45) Date of Patent: May 5, 2015

(54) MANAGING CONTENT THROUGH ACTIONS ON CONTEXT BASED MENUS

(75) Inventors: Matthew Kotler, Sammamish, WA (US); Erez Kikin Gil, Redmond, WA (US); Vignesh Sachidanandam, Mercer Island, WA (US); Andrew Hockman, Seattle, WA (US); Christopher Pratley, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 310 days.

(21) Appl. No.: 13/284,279

(22) Filed: Oct. 28, 2011

(65) Prior Publication Data
US 2013/0019173 A1 Jan. 17, 2013

Related U.S. Application Data

(60) Provisional application No. 61/507,983, filed on Jul. 14, 2011.

(51) Int. Cl.
*G06F 17/00* (2006.01)
*G06F 3/0482* (2013.01)
*G06F 3/0488* (2013.01)

(52) U.S. Cl.
CPC .... *G06F 3/0482* (2013.01); *G06F 2203/04807* (2013.01); *G06F 3/04883* (2013.01); *G06F 3/04886* (2013.01)

(58) Field of Classification Search
None
See application file for complete search history.

(56) References Cited

U.S. PATENT DOCUMENTS

| | | |
|---|---|---|
| 6,281,879 B1 | 8/2001 | Graham |
| 6,542,164 B2 | 4/2003 | Graham |
| 6,664,991 B1 | 12/2003 | Chew et al. |
| 6,828,988 B2 | 12/2004 | Hudson et al. |
| D563,972 S | 3/2008 | Sherry |
| 7,533,340 B2 | 5/2009 | Hudson et al. |
| 7,570,943 B2 | 8/2009 | Sorvari et al. |
| 7,710,409 B2 | 5/2010 | Robbin et al. |
| 7,712,049 B2 | 5/2010 | Williams et al. |
| 7,895,531 B2 | 2/2011 | Radtke et al. |
| 8,239,882 B2 | 8/2012 | Dhanjal et al. |
| 8,245,156 B2 | 8/2012 | Mouilleseaux et al. |
| 8,549,429 B2 * | 10/2013 | Tsuruta et al. ............... 715/810 |
| 2005/0028110 A1 * | 2/2005 | Vienneau et al. ............. 715/834 |
| 2005/0198592 A1 | 9/2005 | Keely et al. |
| 2005/0216834 A1 | 9/2005 | Gu |

(Continued)

OTHER PUBLICATIONS

"Context Menus and Sub-Menus", Retrieved at <<http://ignorethecode.net/blog/2009/03/21/context-menus-sub-menus/>>, Mar. 21, 2009, pp. 9.

(Continued)

*Primary Examiner* — Keith Bloomquist
(74) *Attorney, Agent, or Firm* — Steve Crocker; Jim Ross; Micky Minhas

(57) ABSTRACT

Context based menus are employed for content management through touch or gesture actions, keyboard entries, mouse or pen actions, and similar input. Context based menus may be deployed using a variety of shapes, forms, and content. Different actions and combinations of actions enable users to activate submenus, execute commands, or collapse context based menus. By enabling viewing of menus and execution of commands through context based menus positioned in relation to displayed content user experience is enhanced when interacting with user interfaces with limited display area.

20 Claims, 12 Drawing Sheets

(56) References Cited

U.S. PATENT DOCUMENTS

| | | | |
|---|---|---|---|
| 2006/0117067 A1* | 6/2006 | Wright et al. | 707/104.1 |
| 2007/0168890 A1 | 7/2007 | Zhao et al. | |
| 2007/0180392 A1 | 8/2007 | Russo | |
| 2007/0256029 A1 | 11/2007 | Maxwell | |
| 2008/0305815 A1* | 12/2008 | McDonough | 455/466 |
| 2009/0031253 A1 | 1/2009 | Lee et al. | |
| 2009/0037813 A1 | 2/2009 | Newman et al. | |
| 2009/0083665 A1 | 3/2009 | Anttila et al. | |
| 2009/0307631 A1* | 12/2009 | Kim et al. | 715/830 |
| 2009/0309849 A1 | 12/2009 | Iwema et al. | |
| 2009/0327963 A1 | 12/2009 | Mouilleseaux et al. | |
| 2009/0327964 A1 | 12/2009 | Mouilleseaux et al. | |
| 2010/0122194 A1 | 5/2010 | Rogers | |
| 2010/0192103 A1 | 7/2010 | Cragun et al. | |
| 2010/0299637 A1 | 11/2010 | Chmielewski et al. | |
| 2010/0306702 A1* | 12/2010 | Warner | 715/811 |
| 2011/0066981 A1 | 3/2011 | Chmielewski et al. | |
| 2011/0074828 A1 | 3/2011 | Capela et al. | |
| 2011/0209093 A1 | 8/2011 | Hinckley et al. | |
| 2012/0036434 A1 | 2/2012 | Oberstein | |
| 2012/0042006 A1 | 2/2012 | Kiley | |
| 2012/0221976 A1 | 8/2012 | Johns | |

OTHER PUBLICATIONS

Nguyen, Chuong, "Apple Patent Reveals Gui with Radial Pop-Up Menus in iOS", Retrieved at <<http://www.ubergizmo.com/2010/12/apple-patent-reveals-gui-with-radial-pop-up-menus-in-ios/>>, Feb. 12, 2010, pp. 3.

Koenig, Joerg, "Radial Context Menu", Retrieved at <<http://www.codeproject.om/KB/system/RadialContextMenu.aspx>>, Jul. 21, 2005, pp. 4.

"Pie menu", Retrieved at <<http://web.archive.org/web/20110331143948/http://en.wikipedia.org/wiki/Pie_menu, Mar. 31, 2011, pp. 5.

Hopkins, Don, "Pie Menus on Python/GTK/Cairo for OLPC Sugar", Retrieved at <<http://web.archive.org/web/20110515030103/http://www.donhopkins.com/drupal/node/128>>, May 15, 2011, pp. 10.

"Pie in the Sky", Retrieved at <<http://web.archive.org/web/20100702160443/http://jonoscriptwordpress.com/2008/10/28/pie-in-the-sky/>>, Jul. 2, 2010, pp. 33.

Fitzmaurice, et al., "PieCursor: Merging Pointing and Command Selection for Rapid In-place Tool Switching", Retrieved at <<http://www.autodeskresearch.com/pdf/p1361-fitzmaurice.pdf>>, In Proceedings of the SIGCHI Conference on Human Factors in Computing Systems, Apr. 5, 2008, pp. 10.

"Autodesk Inventor Fusion: Getting Started", Retrieved at <<http://images.autodesk.com/emea_s_main/files/Getting_Started.pdf>>, Retrieved Date: Dec. 28, 2012, pp. 9-18.

"Wacom Tablets. The basics.", <<Retrieved at http://images.autodesk.com/emea_s_main/files/Getting_Started.pdf>>, Feb. 25, 2011, pp. 11.

"ATOK for Android", Retrieved at <<http://www.youtube.com/watch?v=bZiDbz0aJKk>>, Jun. 9, 2012, pp. 2.

"Google Reveals Possible Radial Styled Menus Coming to Android", Retrieved at <<http://www.patentbolt.com/2012/07/google-reveals-possible-radial-styled-menus-coming-to-android.html>>, Jul. 31, 2012, pp. 9.

"Apple Granted a Major Radial Menus Patent for iOS and OS X", Retrieved at <<http://www.patentlyapple.com/patently-apple/2012/08/apple-granted-a-major-radial-menus-patent-for-ios-and-os-x.html>>, Aug. 14, 2012, pp. 12.

Lepinski, et al., "The Design and Evaluation of Multitouch Marking Menus", Retrieved at <<http://www.autodeskresearch.com/pdf/chi2010_mtmm.pdf>>, Proceedings of the 28th International Conference on Human Factors in Computing Syatems, Apr. 10-15, 2010, pp. 2233-2242.

Francone, et al., "Wavelet Menus: A Stacking Metaphor for Adapting Marking Menus to Mobile Devices", Retrieved at <<http://www.gillesbailly.fr/data/doc/pdf/BAILLY_MOBILEHCI09.pdf>>, Proceedings of the 11th International Conference on Human-Computer Interaction with Mobile Devices and Services, Sep. 15-18, 2009, pp. 4.

Koenig, Joerg, "Radial Context Menu", Retrieved at <<http://www.codeproject.com/KB/system/RadialContextMenu.aspx>>, Jul. 21, 2005, pp. 4.

"jQuery Radmenu Plugin", Retrieved at <<http://www.tikku.com/jguery—radmenu—plugin, May 14, 2010, pp. 10.

"Compact Control Menu for Touch-Enabled Command Execution", U.S. Appl. No. 13/090,438, filed Apr. 20, 2010, pp. 27.

"Markup Based Extensibility for User Interfaces", U.S. Appl. No. 11/217,071, filed Aug. 30, 2005, pp. 35.

"International Search Report", Mailed Date: Feb. 1, 2013, Application No. PCT/US2012/046826, Filed date: Jul. 14, 2012, pp. 10.

"European Search Report issued in European Patent Application No. 12810599.6", Mailed Date: Feb. 9, 2015, 10 Pages.

Heller et al., "In Chapter 16: Menus, In Book-Motif Programming Manual for OSF/Motif Release 1.2", vol. Six A, Sep. 11, 1993, pp. 431-470.

* cited by examiner

MANAGING CONTENT THROUGH ACTIONS ON CONTEXT BASED MENUS

CROSS REFERENCE TO RELATED APPLICATIONS

This application claims the benefit of U.S. Provisional Patent Application Ser. No. 61/507,983 filed on Jul. 14, 2011. The disclosures of the provisional patent application are hereby incorporated by reference for all purposes.

BACKGROUND

With the proliferation of computing and networking technologies, two aspects of computing devices have become prevalent: non-traditional (e.g., mouse and keyboard) input mechanisms and smaller form factors. User interfaces for all kinds of software applications have been designed taking typical screen sizes and input mechanisms into account. Thus, user interactions in conventional systems are presumed to be through keyboard and mouse type input devices and a minimum screen size that enables users to interact with the user interface at a particular precision.

Limited display real estate burdens many portable devices from providing full featured content management functionality. Furthermore, gestural commanding is not efficient using conventional menus including support for limited displays or just taking into account where the user's finger/mouse/pen is. Additionally, display devices such as projectors, monitors, and televisions may lack controls for providing content management functionality. Modern software solutions such as on screen keyboards may be awkward to type and encompass valuable display area. Lack of adequate software solutions for managing content on non-traditional devices largely limit device use to content consumption. Carrying multiple devices for content management and consumption defeats portability and unnecessarily takes away from an enriching singular source for content consumption and management.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to context based menus that may be employed in content management through touch or gesture actions, keyboard entries, mouse or pen actions, and similar input. Context based menus may be deployed using a variety of shapes, forms, and content. Different actions and combinations of actions may enable users to activate submenus, execute commands, or collapse context based menus. By enabling viewing of menus and execution of commands through context based menus positioned in relation to displayed content user experience may be enhanced when interacting with user interfaces with limited display area.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
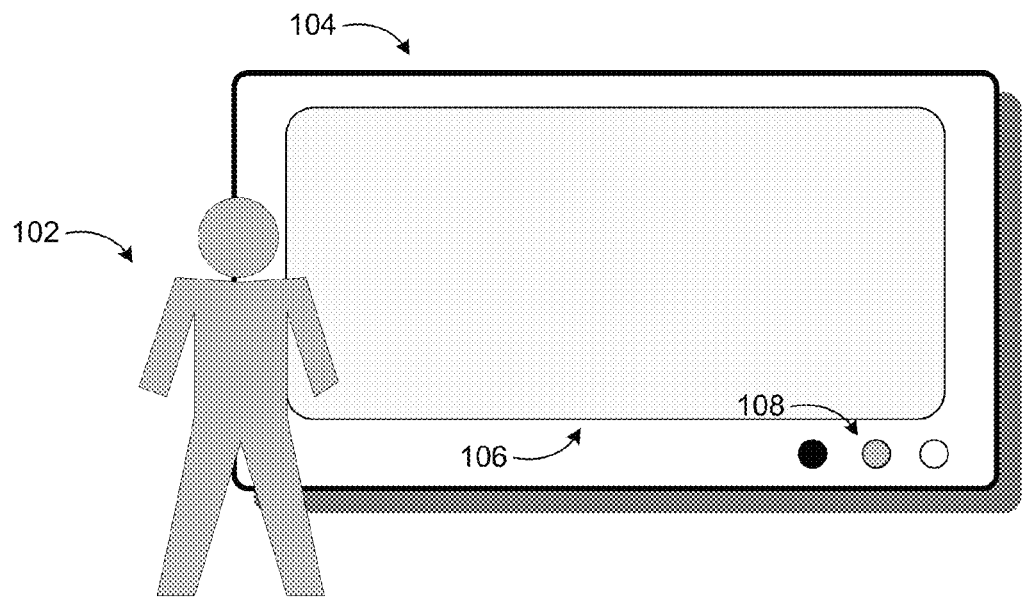
FIGS. 1A and 1B illustrate some example devices, where context based menus may be employed.
Figure 1A:
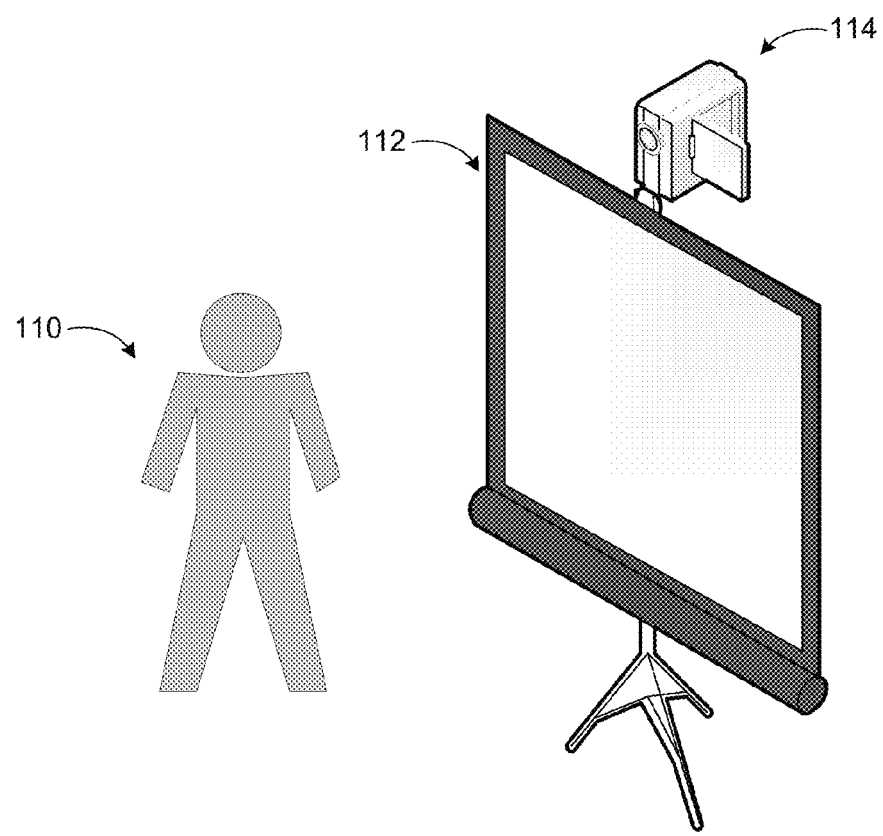

As briefly described above, a user interface may present a context based menu in relation to displayed content. The context based menu may provide commands, links or submenus to manage the displayed content. The device may detect a user action associated with the context based menu. The device may execute a command or display a submenu based on the detected user action, which may include touch, gesture, keyboard entry, mouse click, and/or pen input.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

According to embodiments, a user interface of a touch-enabled or gesture-enabled device may employ context based menus to manage displayed content. A context based menu may make use of features specific to touch or gesture enabled computing devices, but may also work with a traditional mouse and keyboard. Context based menus are used to provide quick access to commonly used commands while viewing or editing displayed content such as documents, emails, contact lists, other communications, or any content (e.g., audio, video, etc.). Context based menus may appear as part of a user interface's regular menu, in a separate viewing pane (e.g., a window) outside or inside the user interface, and so on. Typically, context based menus present a limited set of commands for easy user access, but additional submenus may be presented upon user selection. Commonly used context based menus may appear over the viewed document. A tap or swipe action as used herein may be provided by a user through a finger, a pen, a mouse, or similar device, as well as through predefined keyboard entry combinations or a voice command.

Figure 1B:
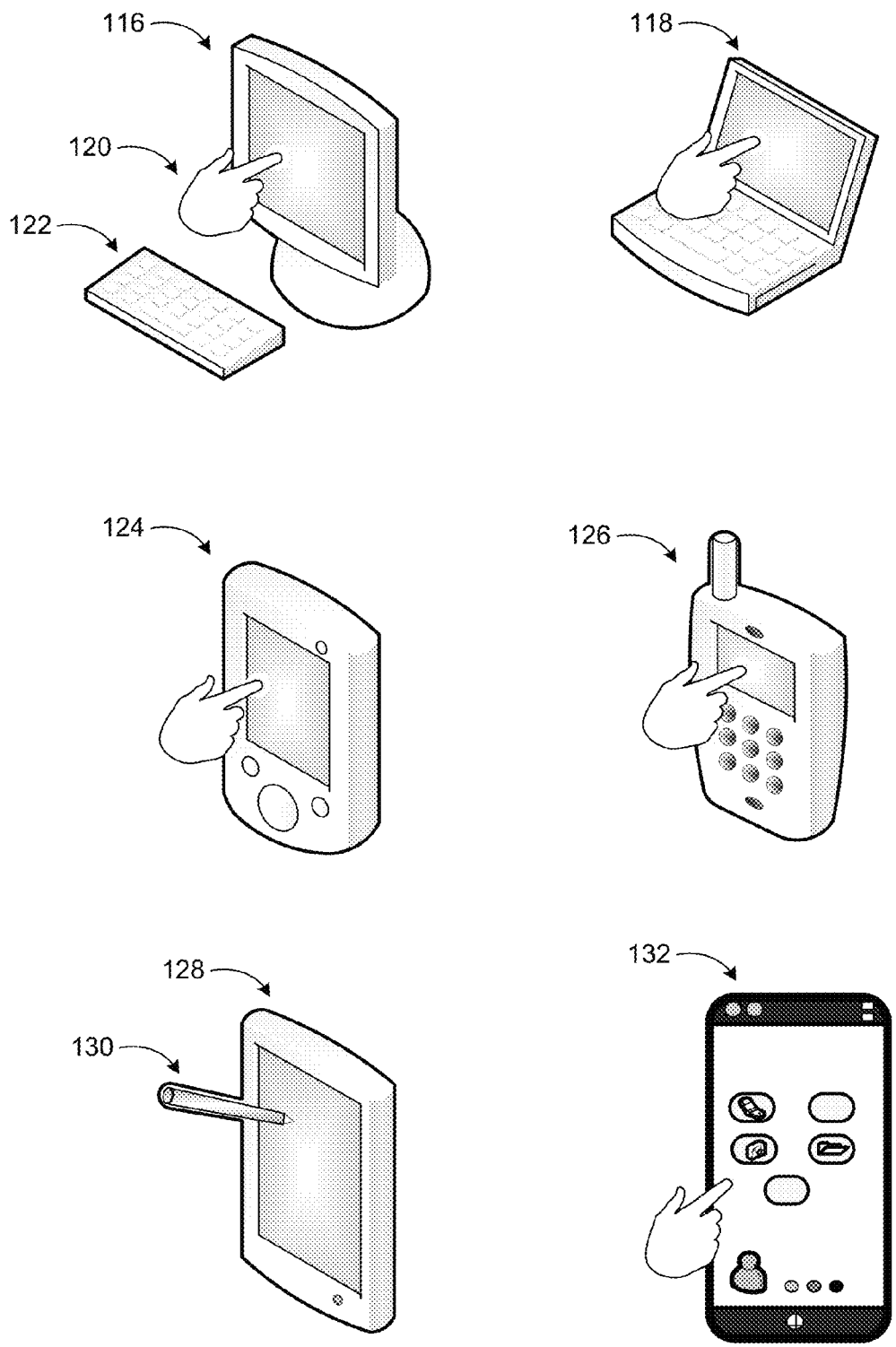

FIGS. 1A and 1B illustrate some example devices, where a context based menus may be employed. As touch and gesture based technologies are proliferating and computing devices employing those technologies are becoming common, user interface arrangement becomes a challenge. Touch and/or gesture enabled devices, specifically portable devices, tend to have smaller screen size, which means less available space for user interfaces. For example, in a user interface that enables editing of a document (text and/or graphics), in addition to the presented portion of the document, a virtual keyboard may have to be displayed further limiting the available space ("real estate"). Thus, in such scenarios, providing a full control menu may be impractical or impossible. Embodiments are directed to a context based menu to manage content.

As mentioned above, smaller available display space, larger content, and different aspect ratios make conventional menus impractical. Existing touch-based devices such as tablet PCs and similar ones are typically directed to data consumption (i.e., viewing). On the other hand, commonly used applications such as word processing applications, spreadsheet applications, presentation applications, and comparable ones are directed to creation (generating and editing documents with textual, graphical, and other content). Currently available context based menus are either invisible most of the time or they block the content when they are visible. A context based menu according to some embodiments may be provided dynamically based on presented content and available space while providing ease of use without usurping much needed display area.

Referring to FIGS. 1A and 1B, some example devices are illustrated, where a context based menu may be provided according to embodiments. Embodiments may be implemented in touch and/or gesture enabled devices or others with keyboard/mouse/pen input, with varying form factors and capabilities.

Device 104 in FIG. 1A is an example of a large size display device, where a user interface may be provided on screen 106. Functionality of various applications may be controlled through hardware controls 108 and/or soft controls such as a context based menu displayed on screen 106. A user may be enabled to interact with the user interface through touch actions or gestures (detected by a video capture device). A launcher indicator may be presented at a fixed location or at a dynamically adjustable location for the user to activate the context based menu. Examples of device 104 may include public information display units, large size computer monitors, and so on.

Device 112 in FIG. 1A is an example for use of a context based menu to control functionality. A user interface may be displayed on a screen or projected on a surface and actions of user 110 may be detected as gestures through video capture device 114. The user's gestures may activate a context based menu to manage displayed content displayed on the device 112.

FIG. 1B includes several example devices such as touch enabled computer monitor 116, laptop computer 118, hand-held computer 124, smart phone 126, tablet computer (or slate) 128, and mobile computing device 132, which may be used for computing, communication, control, measurement, and a number of other purposes. The example devices in FIG. 1B are shown with touch activation 120. However, any of these and other example devices may also employ gesture enabled activation of context based menus to manage displayed content. In addition, tools such as pen 130 may be used to provide touch input. A context based menu may be controlled also through conventional methods such as a mouse input or input through a keyboard 122.

Figure 2:
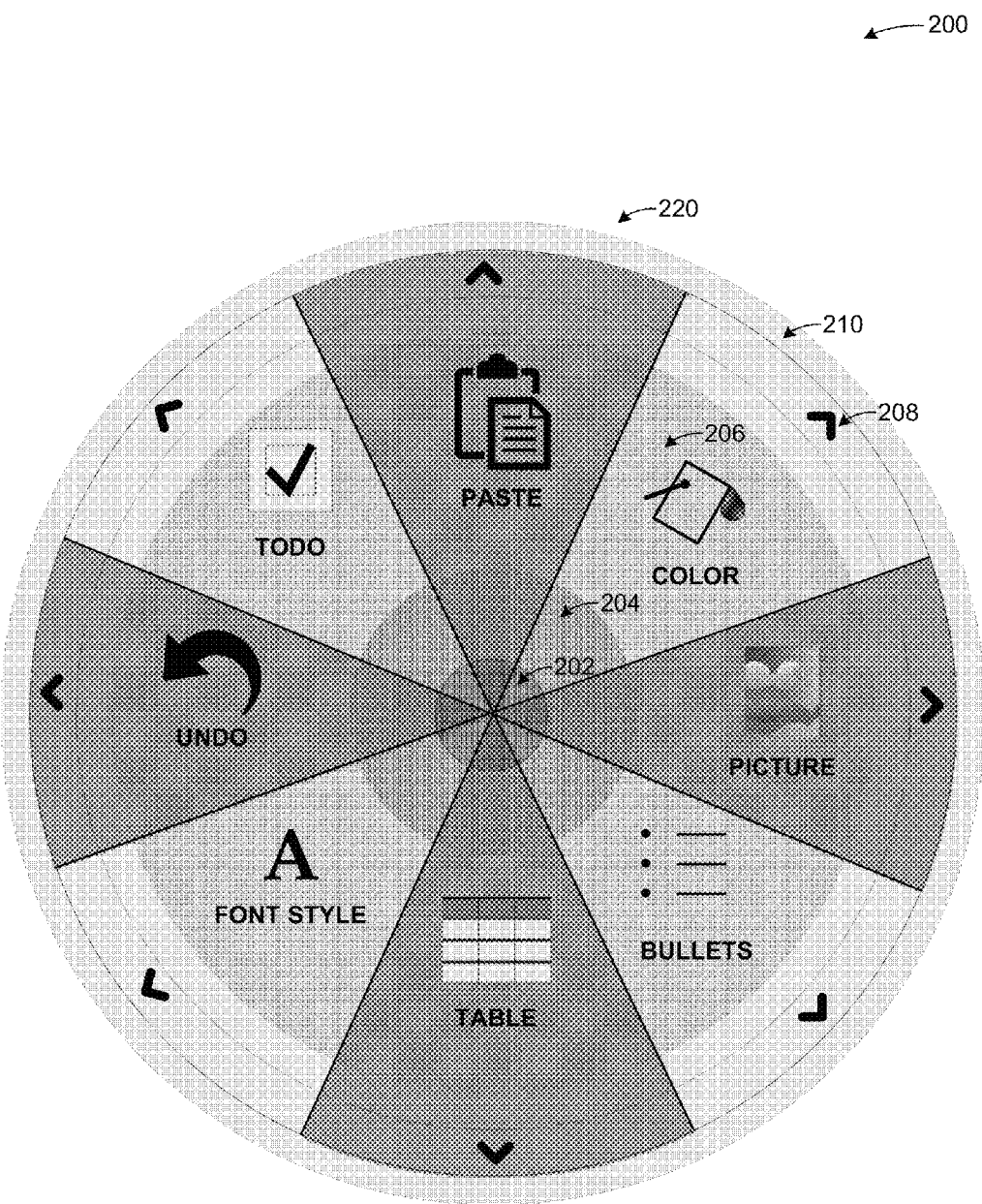
FIG. 2 illustrates an example context based menu according to embodiments.

FIG. 2 illustrates an example context based menu according to embodiments. Diagram 200 displays an example context based menu. The context based menu 220 is shown with a radial shape, but embodiments may be implemented using other forms or shapes as discussed below. The context based menu may provide functionality such as commands, links, and submenus suitable for managing displayed content. In an example scenario, the context based menu 220 may display commands to edit a textual content including, but not limited to, change font style, insert/remove/edit a table, and insert/edit bullets. In some cases, the menu may provide a command that can be executed directly through the displayed element (e.g., icon). In other cases, the displayed element may activate a submenu that includes more detailed commands associated with a particular aspect of content. For example, a submenu may be activated through a table icon (and/or text) on a parent menu and display commands associated with different aspects of creating and editing tables (e.g., adding/removing rows/columns, editing cell characteristics, etc.).

Additionally, the context based menu 220 may display generic user interface commands such as paste and undo. The context based menu 220 may also provide commands to manage hybrid displayed content such as documents containing text and images. Examples may include commands to insert a picture to the document or alter a color scheme of the picture through a fill color command. The context based menu 220 may also be customizable to display useful links to launch or bring forward background applications such as a TODO list. Customization may depend on viewed content and usage patterns such as number of times a user accesses an application while managing a displayed content type. In addition to usage based customization, end user customization—the ability for a user to be able to change the set of commands that are available on context based menu—may also be enabled in a system according to embodiments. Furthermore, developer customization—the ability for a developer to add or change (for all their users) the commands that are available—may further be enabled according to some embodiments.

The context based menu 220 may have a center command button such as a launcher indicator 202. In addition to activating the context based menu 220, the launcher indicator may also collapse the context based menu 220. In some embodiments, the center button may be used for executing commands (by gesturing through the launcher), as a quick way to bring up labels, and/or as a way to move around the context based menu on the canvas. Alternatively, a user may activate the launcher indicator 202 or provide a gesture imitating the activation action to collapse the context based menu 220. The collapse action may minimize the context based menu 220 or hide it from view within the user interface. Additionally, area 204 may be an unreactive region to minimize incorrect user action detection between a collapse/activation action and other user actions provided by the context based menu 220.

Region 206 may include a command or a link to accomplish functionality provided by the context based menu 220. The command may be executed upon detecting a user action in region 206. Alternatively, a link may be launched according to detected user action in region 206.

According to an embodiment, submenu launcher indicator 208 may enable a user to activate a submenu associated with a command or link embedded in region 206. The submenu may be tailored to provide additional features related to link or command in region 206. An example submenu may be a color palette associated to fill in color command in region 206 of the context based menu 220.

According to other embodiments, outer region 210 may correspond to a cancel action. Upon detecting a user action extending to the region 210, the user interface may cancel previously detected user action to execute a command or launch a link. An example may be a user finger (or pen) swipe over region 206 ending in region 210. One of the aspects of a radially designed context based menu is that directionality and not distance dictate what command is executed. As a result, a cancel region may be used over two times the radius of the radial menu out from the center. This means that a user can swipe relatively far out without getting into the cancel region (for illustration purposes, in the drawing, the impression is given that the cancel region is immediately outside the menu).

Of course, other icons, symbols, textual content, etc. may be used to represent specific context based menus and submenus. According to some embodiments, a context based menu may be activated without a launcher indicator being displayed. For example, the menu may be presented directly in response to selection of a portion of the displayed content. Additionally, the context based menu may also be presented according to detection of a predefined gesture or touch based user action.

Figure 3:
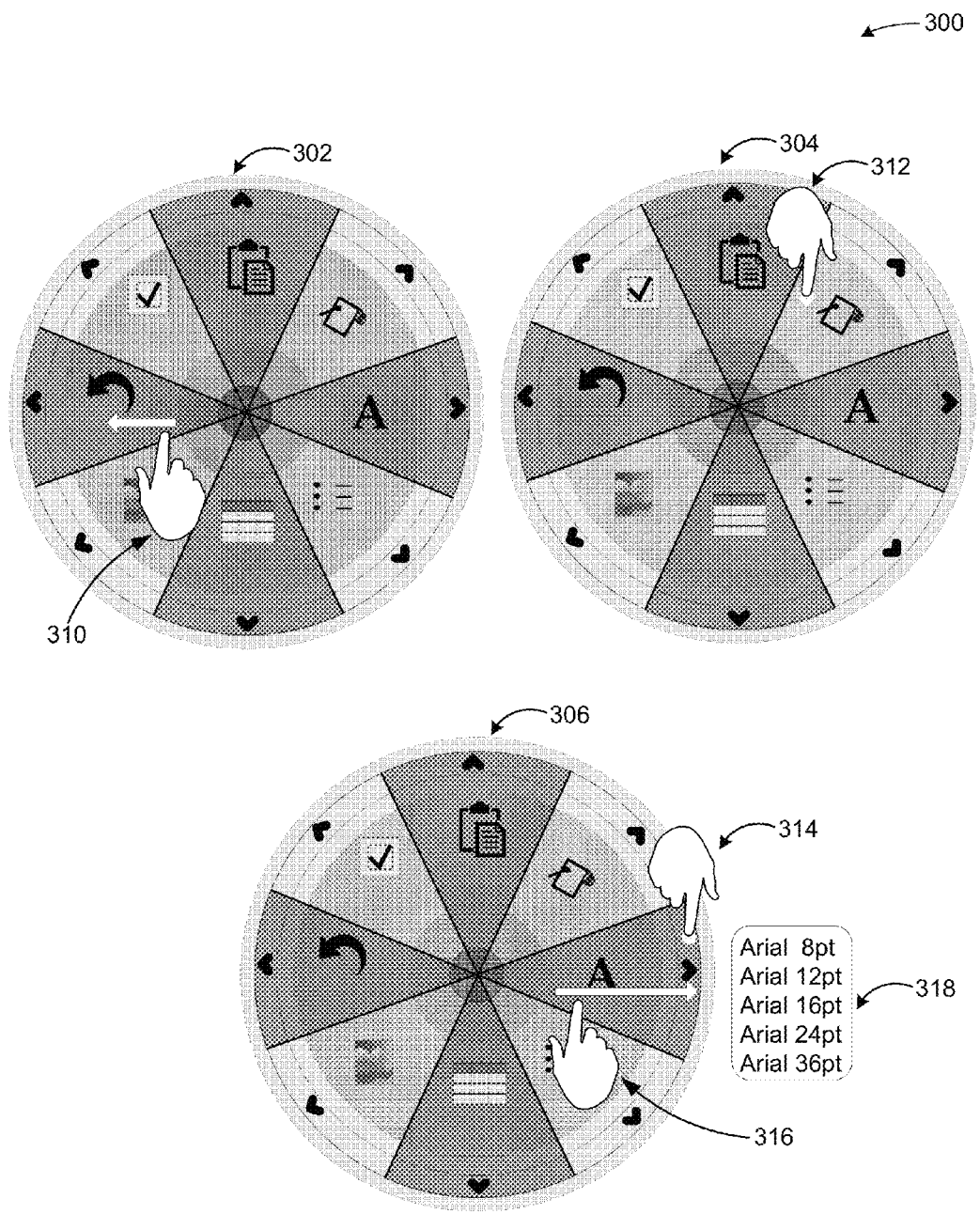
FIG. 3 illustrates example scenarios for using context based menus according to embodiments.

FIG. 3 illustrates example scenarios for using context based menus according to embodiments. Diagram 300 displays example context based menus executing a variety of user actions.

As previously stated, a user action may be a touch action, a gesture action, a keyboard input, a mouse input, or a pen input. The user action may also be a selection of a displayed context based menu item (such as a link, a command, or a submenu). Alternatively, the user action may be a swipe over a portion of the context based menu. A user may swipe 310 a finger over a command to execute the command on the context based menu 302. The command may be executed upon ending the swipe 310 with a withdrawal of contact from the user interface over the command. Alternatively, the user may tap 312 (or click) on the command in the context based menu 304 to execute the command.

The user interface may navigate to a submenu 318 associated with the context based menu 306 in response to a tap by a user on a submenu launcher indicator 314 on the context based menu. The submenu launcher indicator may also be around the center of the context based menu 306. Alternatively, the user interface may navigate to a submenu 318 in response to a swipe from a center section to an outside section of the context based menu 306 without withdrawal of contact from the user interface. Upon detecting the user action to navigate to the submenu, the user interface may display the submenu 318. In an example scenario, the displayed submenu may be a selection of fonts and font sizes corresponding to font style command on the context based menu 306.

A swipe action according to embodiments does not have to originate from the center. If the user puts their finger down on a command, for example, and then swipes over the submenu launcher, they may also navigate into the submenu. Moreover, the directionality of the swipe may be employed in some embodiments. For example, swiping inward from an outer area toward the center may not execute the command while swiping outward may execute the command.

Figure 4A:
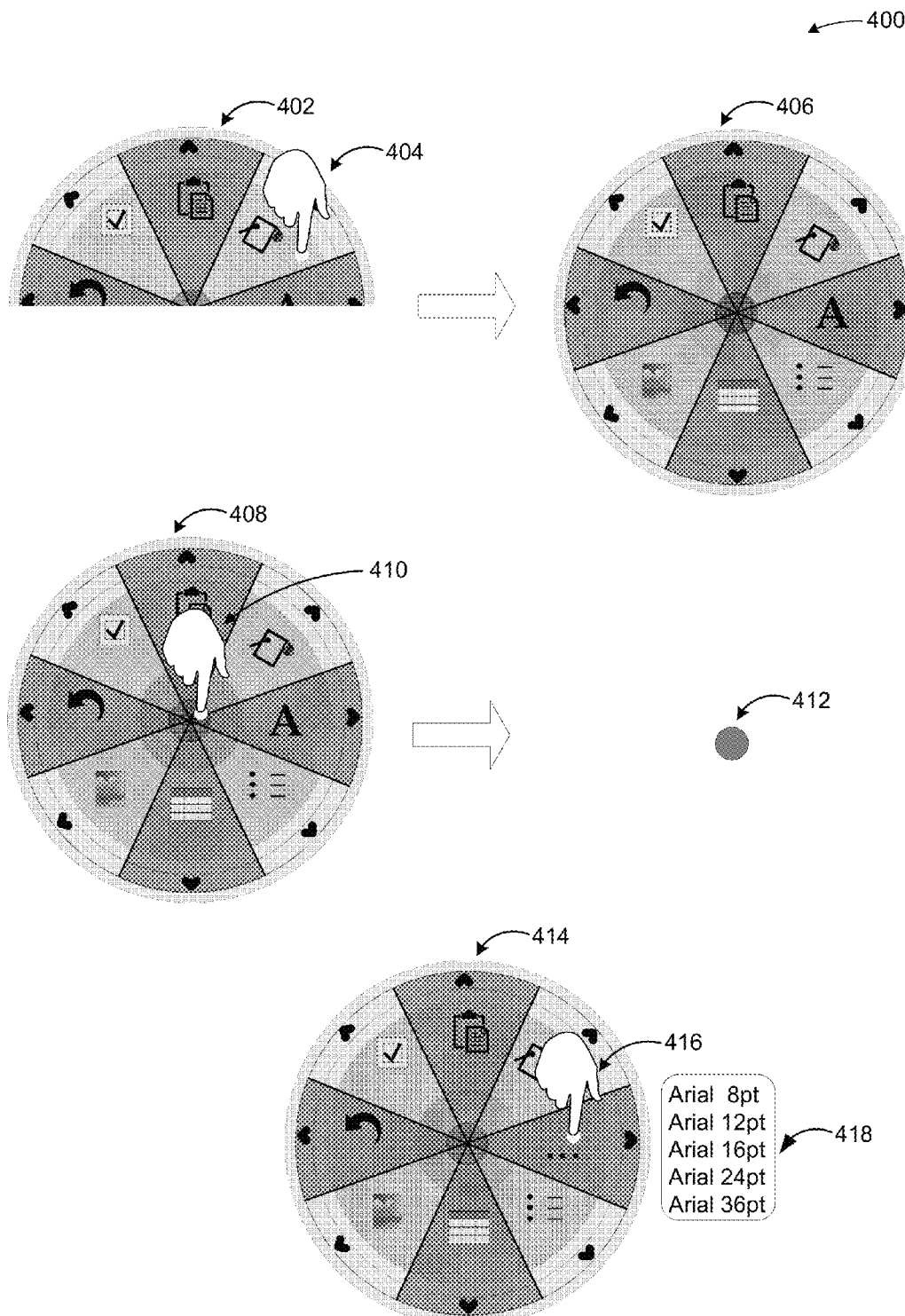
FIGS. 4A and 4B illustrate additional example scenarios for using context based menus according to embodiments.
Figure 4B:
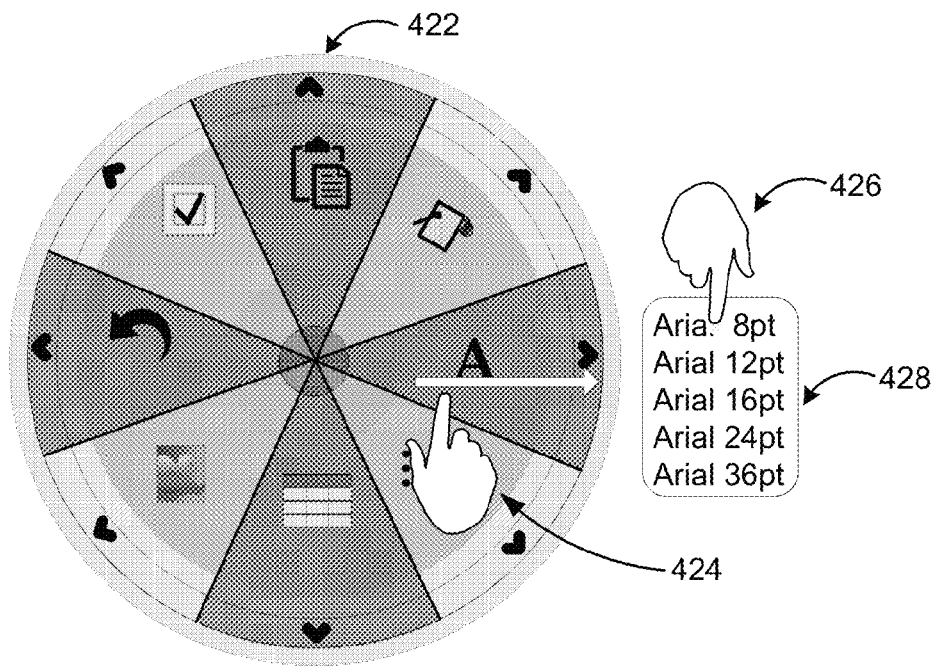
Figure 4B:
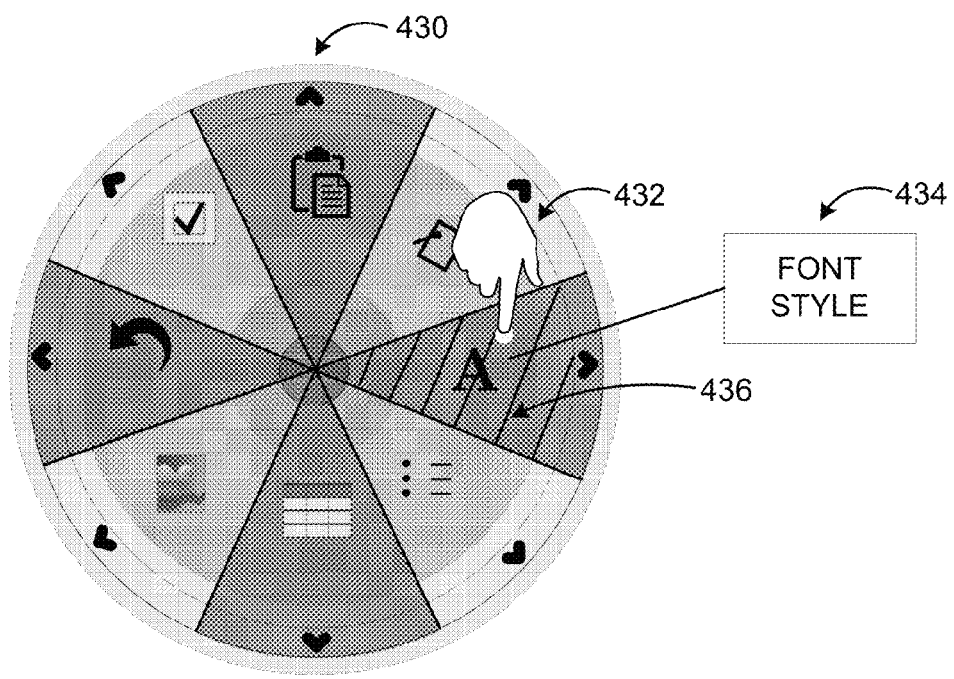

FIGS. 4A and 4B illustrate additional example scenarios for employing context based menus according to embodiments. Diagram 400 displays example context based menus in a variety of scenarios. In an example scenario, context based menu 408 may be collapsed to a minimized state such as launcher indicator 412. The launcher indicator 412 may be responsive to expand the collapsed context based menu to full size. The context based menu 408 may be collapsed in response to a tap 410 on the launcher indicator.

According to an embodiment, the context based menu may display submenus upon selection of a submenu launcher indicator. Additionally, a user may be enabled to navigate to a higher level menu in response to a swipe or tap over a back button of the context based menu.

According to other embodiments, the user may navigate to a submenu of a context based menu 414 through a tap 416 on an ellipses submenu command of the context based menu 414. The user interface may display a submenu 418 upon the user action to execute the ellipses submenu command through the ellipses icon. According to further embodiments, the user may be enabled to navigate to other UI elements. For example, a command or an ellipsis may bring up a task pane, a dialog, or similar UI element that may include a gallery of choices, more detailed commands associated with the menu, or even just other commands.

The user interface may also display a sectional view of the context based menu 402 according to display requirements. The context based menu 402 may display most frequently used commands, links, and submenus according to display area availability. A user action such as a tap 404 may expand the context based menu 402 to full view 406. Additionally, a gesture such as "rotating the wheel" may be employed. In some examples, a button may be included on the menu that causes the menu to rotate—so that the user can just press on that button and the menu may rotate without opening fully.

The user interface may detect multiple user actions on the context based menu 422 in sequence. The touch and/or gesture enabled device may perform two or more actions such as execution of a command and displaying of a submenu in response to the detected sequence of user actions. In an example scenario, the user interface may detect a swipe 424 over a user command ending in a submenu launcher indicator. Subsequent to displaying the associated submenu 428, the user interface may detect a user action of a selection 426 of an item in the submenu 428. Alternatively, the user interface may be configured to replay multiple actions according to registered touch or gesture combination through a representative user action. A representative user action may be any user action spanning a predefined period and having detectable action characteristics. Furthermore, use of multiple finger gestures or similar combination actions may be enabled too. For example, swiping over a command with one finger may trigger executing that command but swiping with two fingers may rotate the menu.

According to other embodiments, the context based menu may display a visual indication or a tooltip in a vicinity of a selected item on the context based menu 430 in response to the user action. In an example scenario, the context based menu 430 may display an alert 436 in response to a user action. The alert may remind the user of a previous user action. The alert may also be a system generated suggestion for a user to execute a command. The suggestion may be determined according to detected user actions and context criteria such as enabled or disabled state. Alternatively, the context based menu 430 may display a tooltip 434 to inform the user about the previous or to be performed user action. An example may be a press and hold action over a command, a link, or a submenu.

Figure 5:
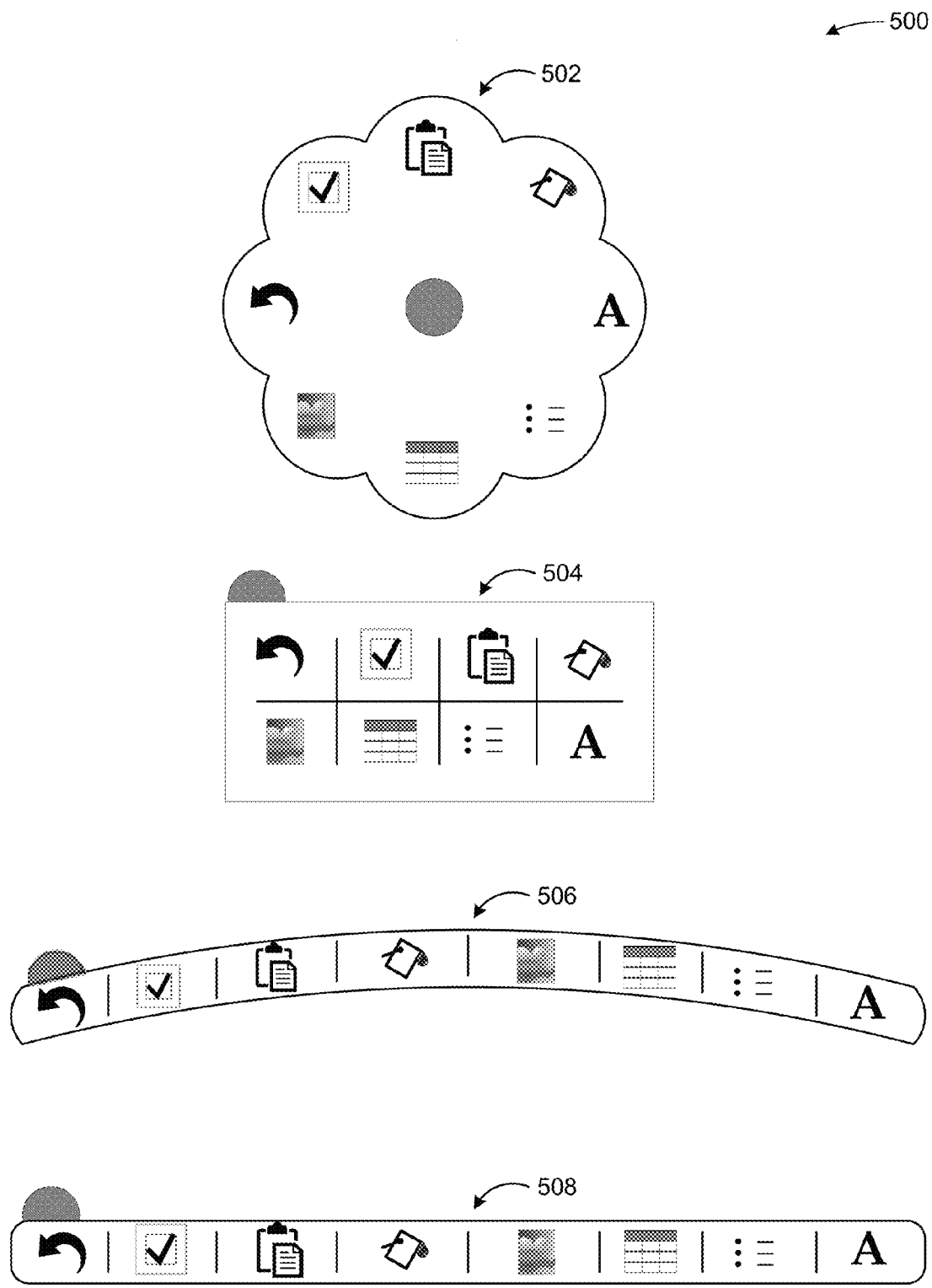
FIG. 5 illustrates alternative examples of context based menus according to some embodiments.

FIG. 5 illustrates alternative examples of context based menus according to some embodiments. Diagram 500 displays context based menus having radial, rectangular, straight in-line, curved in-line, and irregular shapes. Additionally, context based menu 502 may have a flower shape. A flower shape may be preferable in scenarios enhancing visibility of individual commands. Alternatively, commands, links, and submenus may be presented in a rectangular shaped context based menu 504. The launcher indicator may be in a top corner (or any other suitable location) of the context based menu.

In an alternative scenario, the context based menu may have curved in-line shape 506 displaying commands, links, and submenus in a curved sequence. In another alternative scenario, the context based menu may have straight in-line shape 508 while displaying commands, links, and submenus in a horizontal sequence.

According to an embodiment, the user interface may perform command execution control actions associated with the context based menu. The user interface may cancel execution of a command upon detecting a continuation of swipe action in a direction of the command on the context based menu beyond an outer boundary (e.g., radius of a radially shaped menu) of the context based menu. Alternatively, the user interface may execute a command or display a submenu in response to a swipe action in a direction of an item associated with a command and a submenu on the context based menu even if the swipe action is terminated short of the item.

According to another embodiment, the user interface may display the context based menu in response to a swipe action slower than a predefined speed. A predefined speed may be a relative speed according to a single or multiple speed thresholds. In some examples, a swipe action slower than a predefined threshold may result in display of a context based menu (or a submenu). A swipe action faster than the predefined threshold may result in execution of a command instead of display of the menu. Additionally, the touch and/or gesture enabled device may execute (through the user interface) a command without displaying the context based menu in response to a swipe action faster than the predefined speed.

Figure 6:
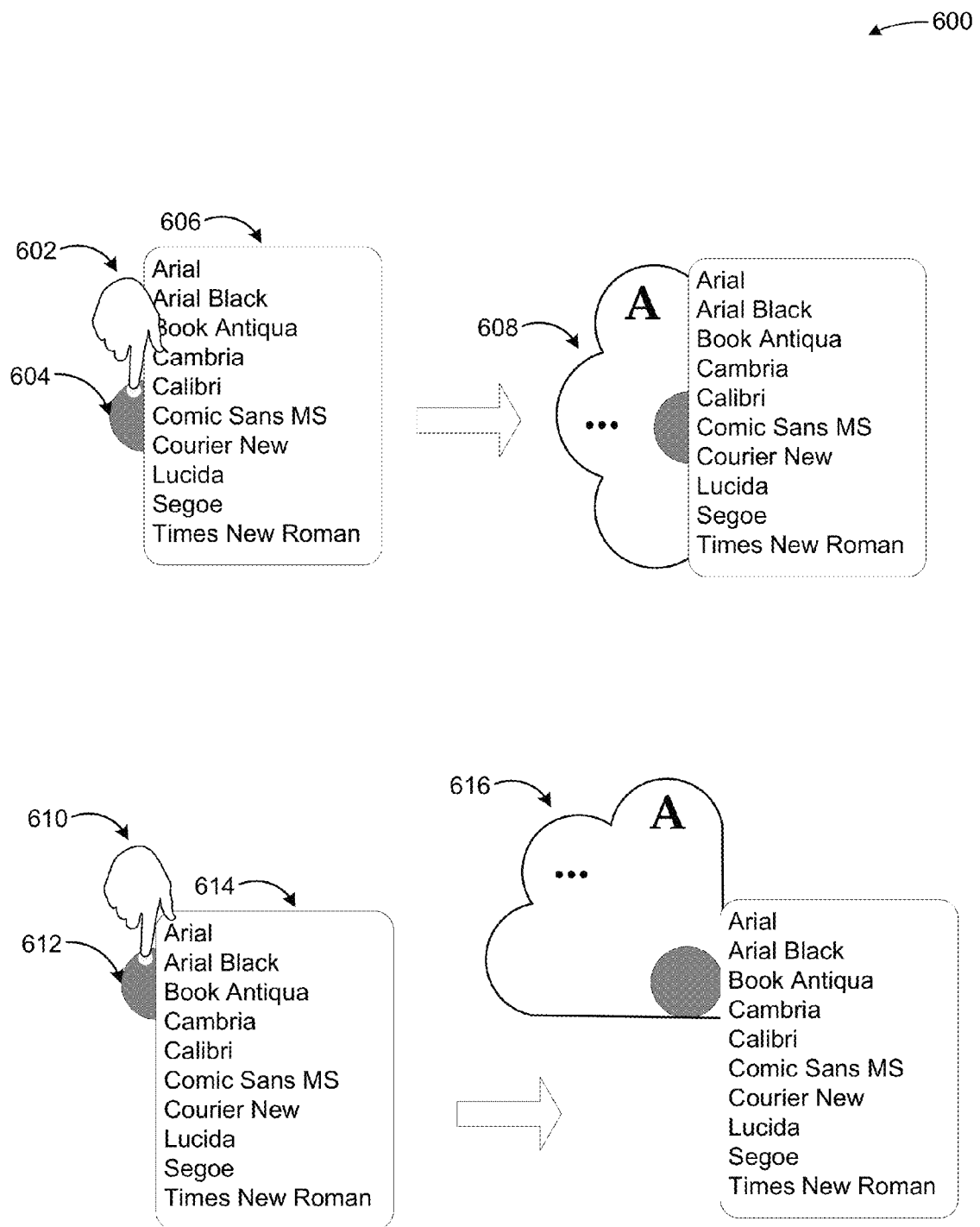
FIG. 6 illustrates example scenarios of context based menus displaying submenus according to other embodiments.

FIG. 6 illustrates example scenarios of context based menus displaying submenus according to other embodiments. Diagram 600 displays multiple examples of expanding a context based menu from a minimized state to a sectional view. A user action may be a tap over a launcher indicator 604. The launcher indicator may be adjacent to a submenu 606 displaying font types. Upon detecting the user action, the user interface may expand to a sectional context based menu 608 to provide functionality for managing displayed content. The context based menu may provide a font type command to display available actions to edit font type of the selected displayed content. Additionally, the sectional context based menu may have submenu button to show and hide a submenu associated with the content management functionality.

In touch-enabled example embodiments, a location of the finger (or touch device) plays a substantial role relative to where the submenu appears. For example, in some embodiments employing a text submenu a left margin may be used, so that when the finger enters into that region it does not actually execute any of the commands on the submenu immediately. In other embodiments, the command under the finger may be kept the same as the top level command, so that the user does not end up covering another command that they did not know about.

Alternatively, the user interface may display a launcher indicator 612 in an alternate location adjacent to the submenu 614. Upon detecting a tap 610, the user interface may expand to another sectional context based menu 616 displaying commands, links, and submenus to manage the displayed content. The sectional context based submenu 616 may have a center button to minimize it.

According to an embodiment, the user interface may detect a press and hold user action. The user interface may display a sectional view of the context based menu in a minimized state according to a peek period beginning with the press and hold action and ending upon a withdrawal of the press and hold action. Subsequently, the user interface may execute a command displayed on the context based menu upon detecting the withdrawal over the displayed command on the context based menu. Thus, the display of the sectional view of the context based menu may be in proportion to the peek period according to some examples.

According to other embodiments, in response to a tap away action from the displayed context based menu, the user interface may perform multiple actions. The user interface may collapse the displayed context based menu by either displaying a launcher indicator or hiding completely the context based menu. The user interface may change the selected portion of the displayed content upon detecting a tap away action following execution of a command. Alternatively, the user interface may maintain the selected portion of the displayed content if no command is executed prior to detecting the tap away action.

According to further embodiments, the user interface may collapse the displayed context based menu following execution of one or more predefined set of commands. An example may be a user action on a launcher indicator responsive to collapse an expanded context based menu. Another example may be selection of a submenu item to edit a selected displayed content. Yet another example may be cancellation of a command by tapping away from the context based menu.

According to yet other embodiments, the user interface may display an item on the context based menu to indicate availability of one or more submenus. The user interface may present the one or more submenus in response to a press and hold action on the displayed item. The timing of the hold action may determine whether the one or more submenus may be displayed.

According to some embodiments, the user interface may display a new item on the context based menu for repeating a combination of related commands following execution of the combination of related commands. The relation between the commands may be through effect over similar content such as managing a common portion of the displayed content. The common portion of the displayed content may be a word, a sentence, a paragraph, a graphic, etc.

According to another embodiment, the user interface may execute a combination of related commands in response to detecting a user action associated with a new item on the context based menu. An example may be a combination of font size change and font type change upon executing new font style command to edit selected text within the displayed content. Alternatively, the user interface may display a submenu as an additional context based menu displayed concurrently with the context based menu or as a replacement context based menu.

Figure 7:
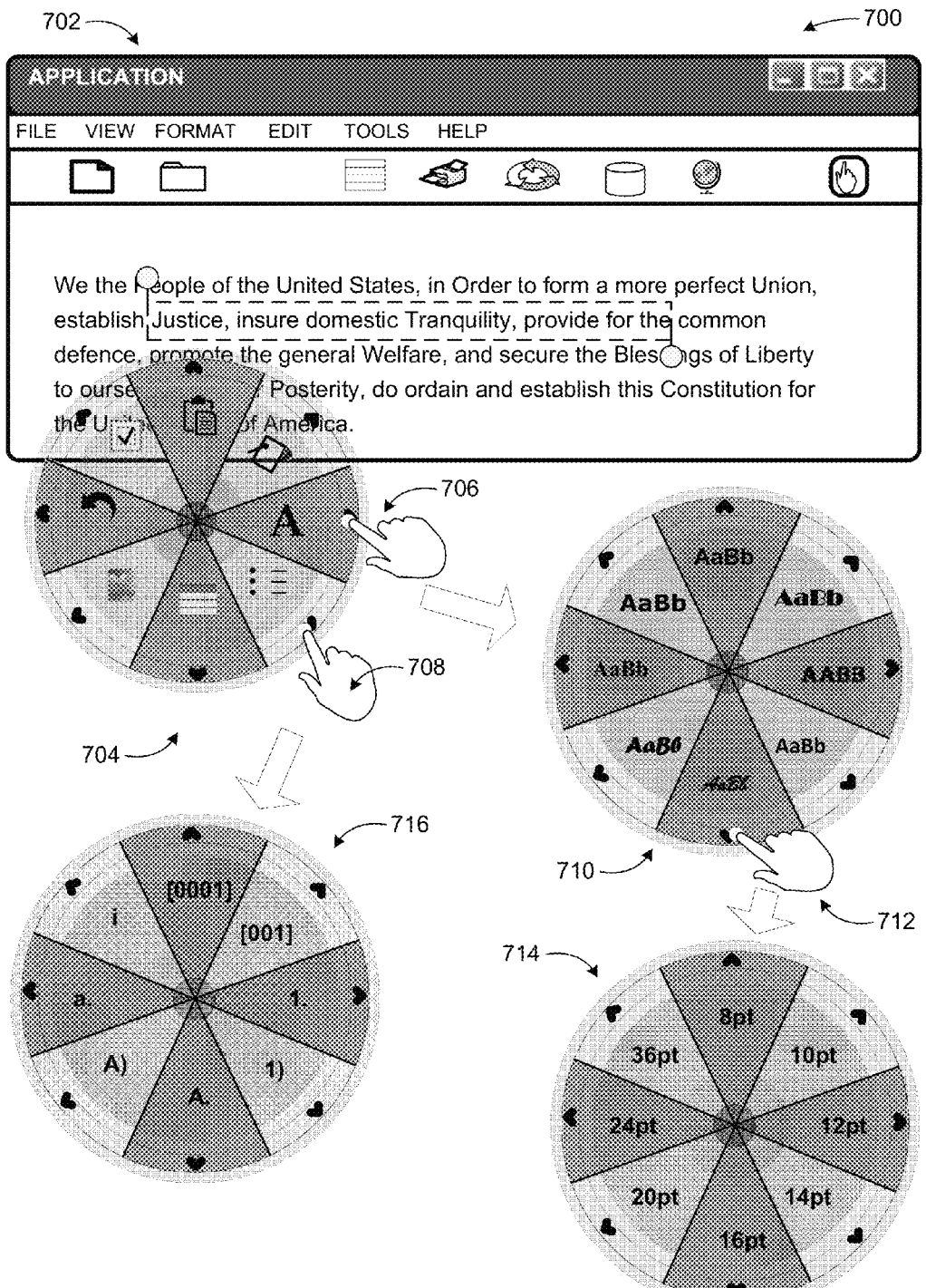
FIG. 7 illustrates example scenarios of context based menu employed to manage displayed content according to some embodiments.

FIG. 7 illustrates example scenarios of context based menu employed to manage displayed content according to some embodiments. Diagram 700 displays a user interface 702 providing content editing functionality through context based menus. The user interface may detect a user action such as tap 706 on a font style command on a context based menu 704 to edit selected text of the displayed content. Execution of the font style command may replace existing commands, links, and submenus with commands, links, and submenus of the submenu in the displayed context based menu. Alternatively, the user interface may display the submenu in another context based menu.

The user interface may detect a tap 712 on a font type command in context based menu 710. The font type command may be a combination action altering the font type of the selected text while displaying a submenu font sizes on the existing context based menu or another context based menu as described above. The user interface may display available font size actions on context based menu 714 and await further user action.

Alternatively, the user interface may detect a tap 708 on a bullet command on context based menu 704. Execution of the bullet command may load bullet submenu on the existing context based menu or to another context based menu as described above. The user interface may display available bullet context on context based menu 716 and await further user action to apply a bullet command to the selected text of the displayed content.

According to other embodiments, a Most Recently Used (MRU) submenu may be employed. An MRU submenu promotes the last choice from the submenu onto the top level. For example, the user may click on the submenu launcher for a color picker submenu and select a color. The next time the user selects the command at the top level for color (without clicking on the submenu launcher), that last color may be applied to the selected portion of displayed content. Similarly, if the user clicks on the submenu launcher for a "tags" command and selects the "Important" tag, then the next time the user clicks on the top level command for tags (without clicking on that submenu launcher) the "Important" tag may be applied.

The example commands, links, submenus, configurations, and context based menus depicted in FIGS. 1 through 7 are provided for illustration purposes only. Embodiments are not limited to the shapes, forms, and content shown in the example diagrams, and may be implemented using other textual, graphical, and similar schemes employing the principles described herein.

Figure 8:
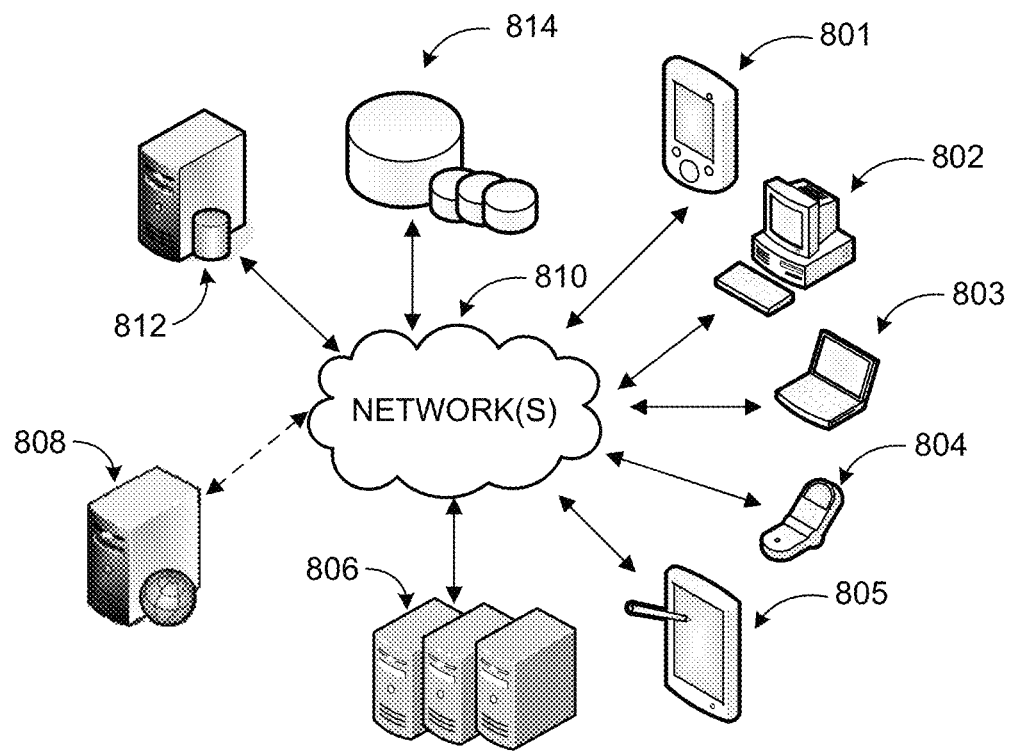
FIG. 8 is a networked environment, where a system according to embodiments may be implemented.

FIG. 8 is a networked environment, where a system according to embodiments may be implemented. In addition to locally installed applications, such as application 822 discussed below, a context based menu for touch and/or gesture enabled devices may be also be employed in conjunction with hosted applications and services that may be implemented via software executed over one or more servers 806 or individual server 808. A hosted service or application may communicate with client applications on individual computing devices such as a handheld computer 801, a desktop computer 802, a laptop computer 803, a smart phone 804, a tablet computer (or slate), 805 ('client devices') through network(s) 810 and control a user interface presented to users.

As previously discussed, a context based menu may be used for managing displayed content provided by the hosted service or application. For example, a browser application, a word processing application, a spreadsheet application, a calendar application, a note taking application, a graphics application, and comparable ones may make use of a context based menu according to embodiments. The context based menu may be activated through a variety of user actions such as selection of content, activation of a launcher indicator, detection of a predetermined touch or gesture action, etc.

Client devices 801-805 are used to access the functionality provided by the hosted service or application. One or more of the servers 806 or server 808 may be used to provide a variety of services as discussed above. Relevant data may be stored in one or more data stores (e.g. data store 814), which may be managed by any one of the servers 806 or by database server 812.

Network(s) 810 may comprise any topology of servers, clients, Internet service providers, and communication media. A system according to embodiments may have a static or dynamic topology. Network(s) 810 may include a secure network such as an enterprise network, an unsecure network such as a wireless open network, or the Internet. Network(s) 810 may also coordinate communication over other networks such as PSTN or cellular networks. Network(s) 810 provides communication between the nodes described herein. By way of example, and not limitation, network(s) 810 may include wireless media such as acoustic, RF, infrared and other wireless media.

Many other configurations of computing devices, applications, data sources, and data distribution systems may be employed to provide a context based menu for managing displayed content. Furthermore, the networked environments discussed in FIG. 8 are for illustration purposes only. Embodiments are not limited to the example applications, modules, or processes.

Figure 9:
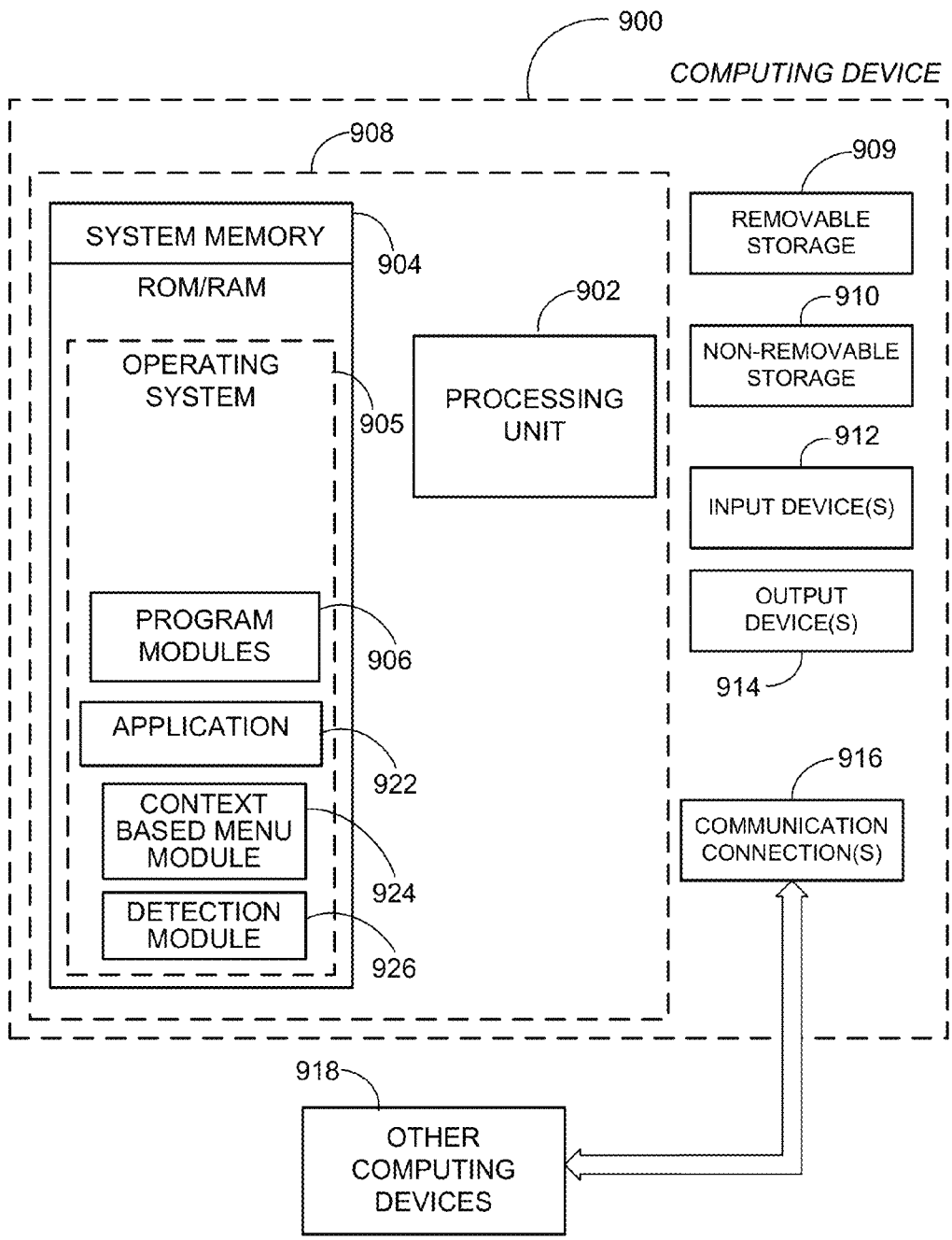
FIG. 9 is a block diagram of an example computing operating environment, where embodiments may be implemented.

FIG. 9 and the associated discussion are intended to provide a brief, general description of a suitable computing environment in which embodiments may be implemented. With reference to FIG. 9, a block diagram of an example computing operating environment according to embodiments is illustrated, such as computing device 900. In a basic configuration, computing device 900 may be any device in stationary, mobile, or other form such as the example devices discussed in conjunction with FIGS. 1A, 1B, and 8, and include at least one processing unit 902 and system memory 904. Computing device 900 may also include a plurality of processing units that cooperate in executing programs. Depending on the exact configuration and type of computing device, the system memory 904 may be volatile (such as RAM), non-volatile (such as ROM, flash memory, etc.) or some combination of the two. System memory 904 typically includes an operating system 905 suitable for controlling the operation of the platform, such as the WINDOWS®, WINDOWS MOBILE®, or WINDOWS PHONE® operating systems from MICROSOFT CORPORATION of Redmond, Wash. The system memory 904 may also include one or more software applications such as program modules 906, application 922, context based menu module 924, and detection module 926.

Context based menu module 924 may operate in conjunction with the operating system 905 or application 922 and provide a context based menu as discussed previously. Context based menu module 924 may also provide commands, links, and submenus to manage displayed content. Detection module 926 may detect user actions and execute a command, launch a link, or navigate to submenu. This basic configuration is illustrated in FIG. 9 by those components within dashed line 908.

Computing device 900 may have additional features or functionality. For example, the computing device 900 may also include additional data storage devices (removable and/or non-removable) such as, for example, magnetic disks, optical disks, or tape. Such additional storage is illustrated in FIG. 9 by removable storage 909 and non-removable storage 910. Computer readable storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer readable storage media may be part of computing device 900. Computing device 900 may also have input device(s) 912 such as keyboard, mouse, pen, voice input device, touch input device, an optical capture device for detecting gestures, and comparable input devices. Output device(s) 914 such as a display, speakers, printer, and other types of output devices may also be included. These devices are well known in the art and need not be discussed at length here.

Computing device 900 may also contain communication connections 916 that allow the device to communicate with other devices 918, such as over a wireless network in a distributed computing environment, a satellite link, a cellular link, and comparable mechanisms. Other devices 918 may include computer device(s) that execute communication applications, other directory or policy servers, and comparable devices. Communication connection(s) 916 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 10:
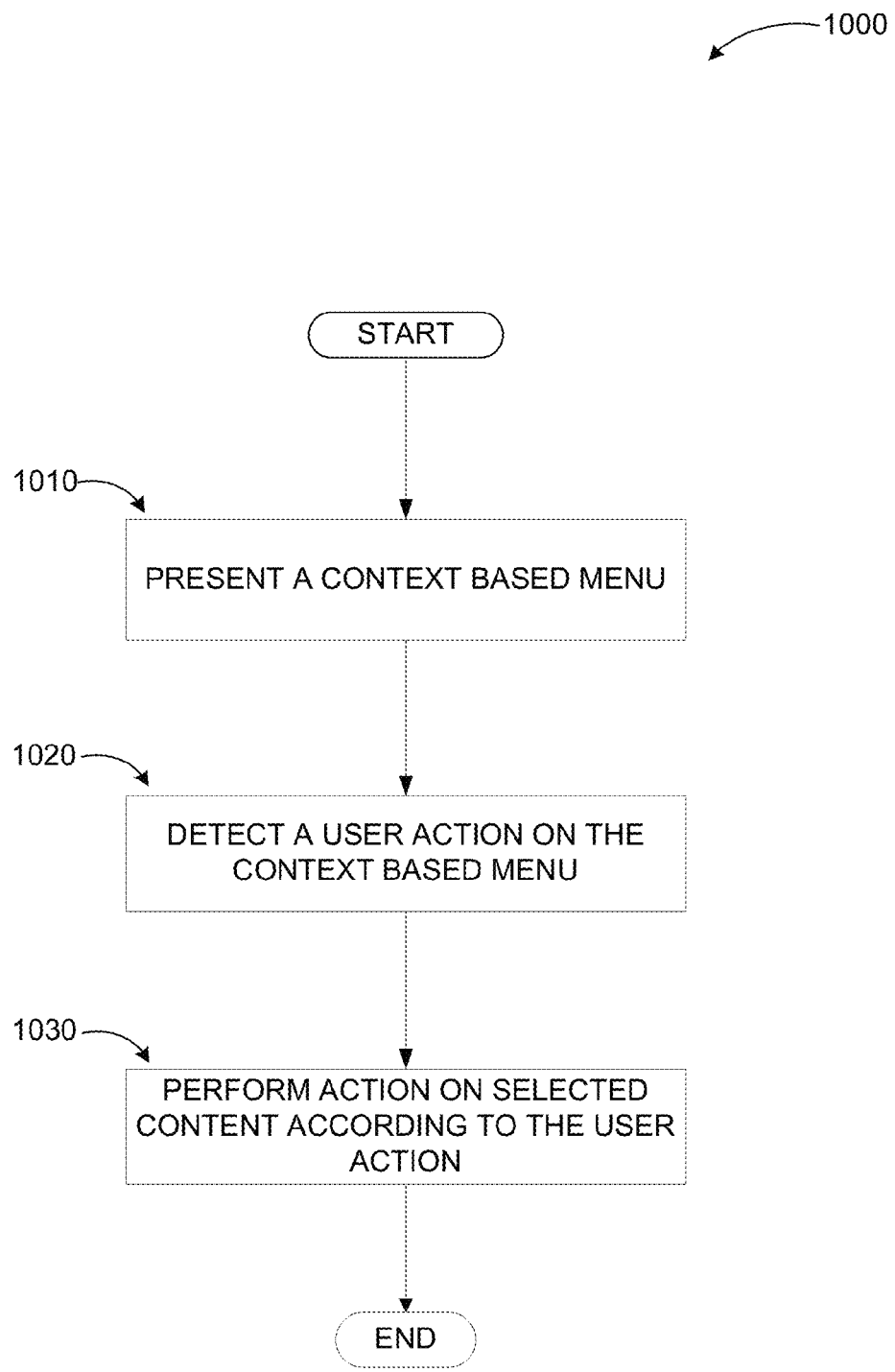
FIG. 10 illustrates a logic flow diagram for a process of managing displayed content through a context based menu in touch and gesture enabled devices according to embodiments.

FIG. 10 illustrates a logic flow diagram for a process of managing displayed content through context based menu in touch and/or gesture enabled devices according to embodiments. Process 1000 may be implemented as part of an application or an operating system of any computing device capable of accepting touch, gesture, keyboard, mouse, pen, or similar inputs.

Process 1000 begins with operation 1010, where a context based menu may be presented by a user interface. The context based menu may have a radial, rectangular, straight in-line, curved in-line, and irregular shape. The context based menu may be a sectional context based menu conserving user interface real estate. The context based menu may be presented in response to detecting a tap action on a launcher, a tap action on a selection of a portion of displayed content, an insertion point, a tap action on a selection gripper, a swipe action on the launcher slower than a predefined speed, a mouse input, or a keyboard input corresponding to the mouse input. Subsequently, the user interface may detect a user action on the context based menu at operation 1020. The user action may be a tap, a slide, a press and hold, or similar user action including, but not limited to keyboard entries, mouse clicks, pen inputs, optically captured gestures, voice commands, etc. At operation 1030, the user interface may perform an action on selected content according to the user action. The user interface may execute a command, launch a link, or navigate to a submenu to manage the displayed content.

The operations included in process 1000 are for illustration purposes. Presenting context based menus according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing a context based menu to manage displayed content, the method comprising:

in response to detecting one of: a tap action on a launcher, a tap action on a selection of a portion of displayed content, a tap action on an insertion point gripper, a swipe action on the launcher slower than a predefined speed, a mouse input, and a keyboard input, presenting the context based menu in relation to the displayed content on a user interface, wherein the context based menu includes at least one from a set of: a command and a link to a submenu;

in response to detecting a gesture associated with the context based menu, rotating the context based menu, wherein the context based menu rotates without expanding;

in response to detecting a press and hold action, displaying a sectional view of the context based menu in a minimized state according to a peek period beginning with the press and hold action and ending upon a withdrawal of the press and hold action to conserve available space on the user interface, wherein a display of the sectional view is in proportion to the peek period;

detecting one of a gesture and a touch based action associated with the context based menu, wherein the action includes one of: a selection of a displayed context based menu item and a swipe over a portion of the context based menu; and one of: executing a command and displaying a submenu in response to the detected action, wherein multiple finger gestures are enabled such that swiping over the command with one finger executes the command and swiping over the command with two fingers rotates the context based menu.

2. The method of claim 1, wherein the action further includes at least one from a set of: a finger touch, an optically detected gesture, a keyboard input, a pen input, and a mouse input.

3. The method of claim 1, further comprising:
providing a Most Recently Used (MRU) menu item on the context based menu representing a most recently used item in an associated submenu.

4. The method of claim 1, further comprising:
executing a command displayed on the context based menu in response to one of:
a tap on the command on the context based menu; and
a swipe over the command on the context based menu ending with a withdrawal of a contact from the user interface over the command.

5. The method of claim 1, further comprising:
navigating to a submenu associated with the context based menu in response to one of:
a tap on a submenu launcher indicator on the context based menu;
a swipe from a center section toward an outside section of the context based menu without withdrawal of contact from the user interface; and
another swipe over the submenu launcher regardless of a origination of the other swipe.

6. The method of claim 1, further comprising:
collapsing the context based menu in response to a tap on a launcher indicator of the context based menu; and
navigating to a higher level menu in response to one of a swipe and a tap over a back button of the context based menu.

7. The method of claim 1, further comprising:
one of: executing a command displayed on the context based menu upon detecting the withdrawal of the press and hold action over the displayed command on the context based menu and navigating to a submenu.

8. The method of claim 1, further comprising:
expanding the displayed sectional view of the context based menu in proportion to the peek period.

9. The method of claim 1, further comprising:
displaying at least one from a set of: a visual indication and a tooltip in a vicinity of a selected item on the context based menu in response to the action.

10. The method of claim 1, further comprising:
detecting a plurality of actions on the context based menu in sequence; and
performing at least two actions including one or more: execution of a command, display of a user interface element independent of the context based menu, and display of a submenu in response to the detected sequence of actions.

11. The method of claim 1, further comprising one or more of:
cancelling execution of a command upon detecting a continuation of a swipe action in a direction of the displayed command on the context based menu beyond an outer boundary of the context based menu;
one of executing a command and displaying a submenu in response to a swipe action in a direction of an item associated with the one of the command and the submenu on the context based menu even if the swipe action is terminated short of the item;
in response to a swipe action slower than a predefined speed, displaying the context based menu; and
in response to a swipe action faster than the predefined speed, executing a command without displaying the context based menu.

12. The method of claim 1, wherein the displayed context based menu has one of a radial, a rectangular, a straight in-line, a curved in-line, and an irregular shape.

13. A computing device for providing a context based menu to manage displayed content, the computing device comprising:
an input device configured to detect at least one of a tap action and a swipe action;
a memory;
a processor coupled to the memory, the processor executing an application and causing a user interface associated with the application to be displayed on a screen, wherein the processor is configured to:
in response to detecting one of: a tap action on a launcher, a tap action on a selection of a portion of displayed content, a tap action on an insertion point gripper, a swipe action on the launcher slower than a predefined speed, a mouse input, and a keyboard input, display the context based menu on the user interface in relation to the displayed content, wherein the context based menu includes at least one from a set of: a command and a link to a submenu;
in response to detecting a press and hold action, display a sectional view of the context based menu in a minimized state according to a peek period beginning with the press and hold action and ending upon a withdrawal of the press and hold action to conserve available space on the user interface, wherein a display of the sectional view is in proportion to the peek period;
detect one of a tap action and a swipe action associated with the context based menu;
one of: execute a command and display a submenu in response to the detected action; and
perform at least two actions including one or more of: execution of a command and display of a submenu in response to detecting a sequence of actions; and
replay the at least two actions according to a registered touch or gesture combination for the sequence of actions through one representative user action of the registered combination that spans a predefined period and has detectable action characteristics.

14. The computing device of claim 13, wherein the processor is further configured to:
   in response to a tap away action from the displayed context based menu, one or more of:
   collapse the displayed context based menu such that one of: a launcher indicator is displayed and the context based menu is completely hidden;
   if the tap away action is detected following execution of a command, change the selected portion of the displayed content; and
   if no command is executed prior to detection of the tap away action, maintain the selected portion of the displayed content.

15. The computing device of claim 13, wherein the processor is further configured to:
   collapse the displayed context based menu following execution of one of a predefined set of commands.

16. The computing device of claim 13, wherein the processor is further configured to:
   display an item on the context based menu indicating availability of a submenu; and
   in response to a press and hold action on the displayed item, presenting the submenu, wherein a timing of the press and hold action determines whether the submenu is to be displayed.

17. A computer-readable memory device with instructions stored thereon for providing a context based menu to manage displayed content, the instructions comprising:
   in response to detecting one of: a tap action on a launcher, a tap action on a selection of a portion of displayed content, a tap action on an insertion point gripper, a swipe action on the launcher slower than a predefined speed, a mouse input, and a keyboard input, displaying the context based menu on a user interface in relation to the displayed content, wherein the context based menu includes at least one from a set of: a command and a link to a submenu;
   in response to detecting a press and hold action, displaying a sectional view of the context based menu in a minimized state according to a peek period beginning with the press and hold action and ending upon a withdrawal of the press and hold action to conserve available space on the user interface, wherein a display of the sectional view is in proportion to the peek period;
   detecting an action associated with the context based menu;
   one of: executing a command and displaying a submenu in response to the detected action, wherein the execution of the command is cancelled in response to detecting a continuation of the detected action in a direction extending beyond an outer boundary of the context based menu;
   performing at least two actions including one or more: execution of a command and display of a submenu in response to detecting a sequence of actions; and
   collapsing the displayed context based menu in response to one of another action and execution of one of a predefined set of commands.

18. The computer-readable memory device of claim 17, wherein the instructions further comprise:
   following execution of a combination of related commands on the selected portion of the content, displaying a new item on the context based menu for repeating the combination of related commands.

19. The computer-readable memory device of claim 18, wherein the instructions further comprise:
   in response to detecting an action associated with the new item on the context based menu, executing the combination of the related commands.

20. The computer-readable memory device of claim 17, wherein a submenu is displayed as one of: an additional context based menu displayed concurrently with the context based menu and a replacement context based menu.

\* \* \* \* \*